United States Patent

[11] 3,621,392

| [72] | Inventors | Leonard N. Liebermann<br>La Jolla;<br>Stanley H. Lai, San Diego, both of Calif. |
|---|---|---|
| [21] | Appl. No. | 4,819 |
| [22] | Filed | Jan. 22, 1970 |
| [45] | Patented | Nov. 16, 1971 |
| [73] | Assignee | Thermal Industries of Florida, Inc.<br>Miami, Fla.<br>Continuation-in-part of application Ser. No. 774,113, Nov. 7, 1968. |

[54] CONNECTIONLESS ELECTRICAL METER FOR MEASURING VOLTAGE OR POWER FACTOR
22 Claims, 11 Drawing Figs.

[52] U.S. Cl. ............................................... 324/142,
324/127
[51] Int. Cl. ............................................... G01r 7/00,
G01r 21/00
[50] Field of Search ............................................... 324/140,
141, 142, 126, 127, 123; 307/251, 247; 328/160

[56] References Cited
UNITED STATES PATENTS
2,350,170  5/1944  Kinnard........................ 324/141 UX
3,068,409 12/1962 Bigliano et al................ 324/126 X
3,477,024 11/1969 Pelta............................ 324/126

FOREIGN PATENTS
346,926   4/1931  Great Britain................ 324/127
645,668  11/1950  Great Britain................ 324/142

OTHER REFERENCES
Highleyman et al.; IRE Trans. Comm. Sys.; Sept. 1962; pp. 311–317. Copy in 328/160.

Primary Examiner—Alfred E. Smith
Attorney—Pennie, Edmonds, Morton, Taylor and Adams ABSTRACT: A connectionless electrical meter is described which is capable of measuring the power carried by a conductor at a voltage with respect to ground, or the power factor thereof, without the necessity for any ohmic connection between the meter and the circuit being measured. Conductor current is measured by magnetic induction with an openable transformer core which surrounds the conductor. A signal in-phase with the voltage is obtained by electrostatic induction. In certain embodiments of the invention, a unique voltage probe is used for obtaining a signal proportional to the conductor voltage. Apparatus described herein employing such voltage probe is additionally useful for measurement of voltage independently of power or power factor.

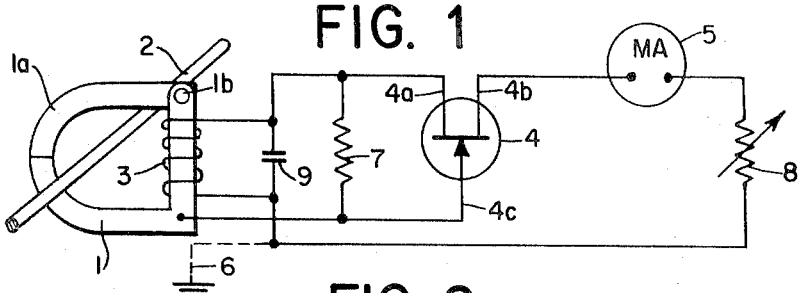
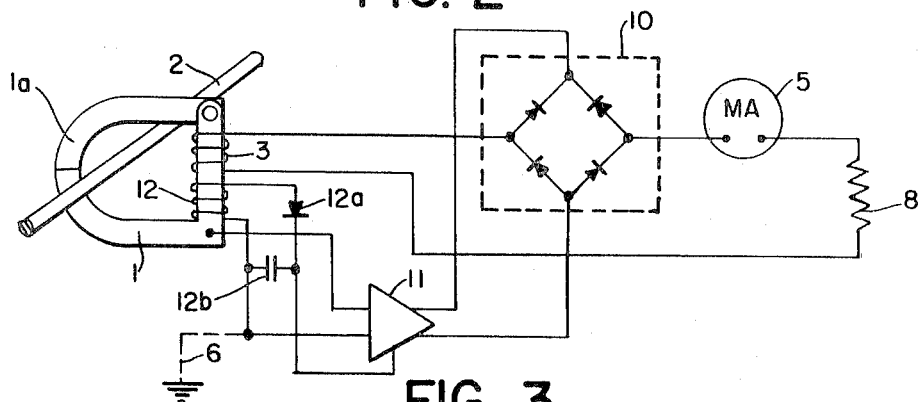
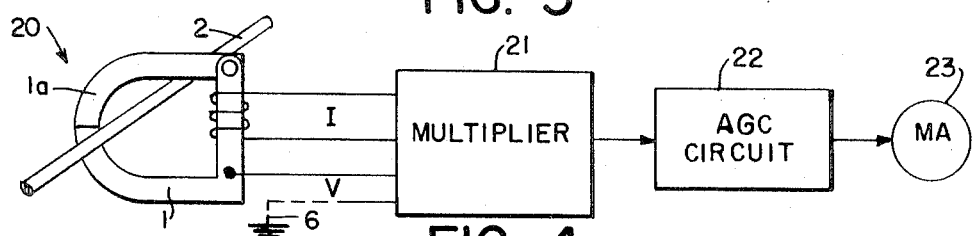
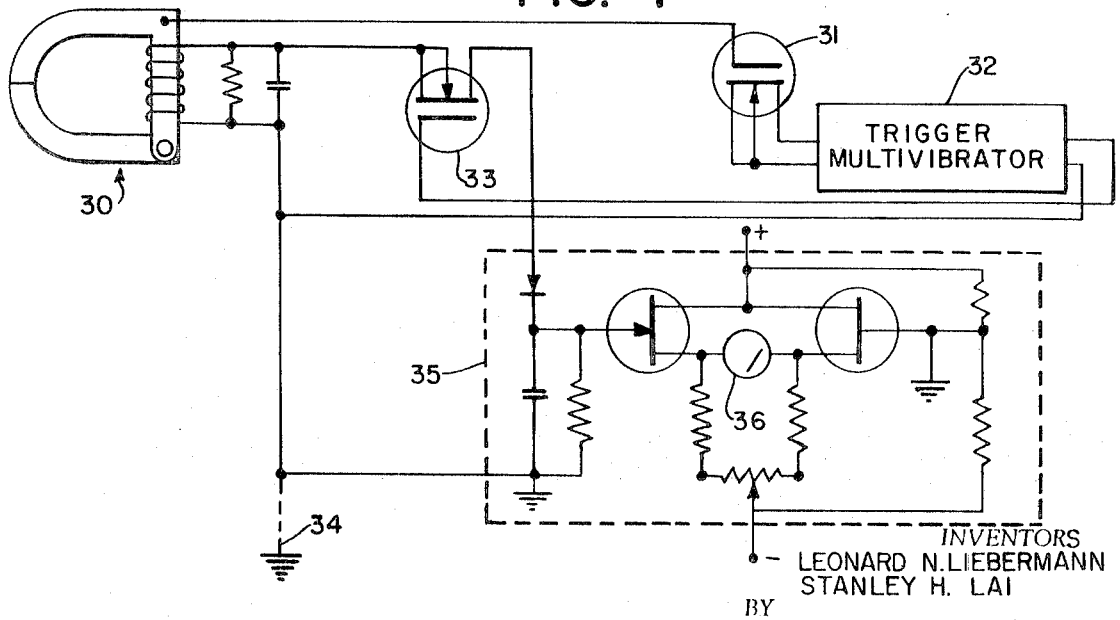
INVENTORS
LEONARD N. LIEBERMANN
STANLEY H. LAI

INVENTORS
LEONARD N. LIEBERMANN
STANLEY H. LAI

INVENTORS
LEONARD N. LIEBERMANN
STANLEY H. LAI
BY
*Pennie, Edmonds, Morton, Taylor & Adams*
ATTORNEYS

CONNECTIONLESS ELECTRICAL METER FOR MEASURING VOLTAGE OR POWER FACTOR

RELATED APPLICATIONS

This application is a continuation-in-part of application Ser. No. 774,113, filed Nov. 7, 1968 for a "Connectionless Wattmeter."

BACKGROUND OF THE INVENTION

1. Field of the Invention

This invention relates to an alternating-current-measuring device which is capable of measuring power, power factor, voltage and current without any ohmic connection between the meter and the circuit whose power is to be measured. The term "ohmic connection" as used herein refers to a direct wire connection, such as by a metal contact probe, or clamp, as employed in conventional measurement instruments.

2. Description of the Prior Art

Devices for measuring AC electrical current (AC ammeters) which do not require ohmic connections are commonplace. These conventionally are of the split-core current transformer type in which the transformer core (i.e. a so-called openable transformer core) is clamped around the insulated conductor to measure the current flowing in it.

Clamp-on ammeters, as such devices are called, are widely utilized for trouble diagnosis and analysis of AC motor-driven devices. However, an ammeter alone is incapable of diagnosing many of the operating problems commonly encountered in such devices. In certain types of motors, for example, malfunction only slightly affects the load current, but greatly affects power as well as the power factor, which is a measure of the phase angle between voltage and current. An ammeter alone is incapable of indicating anything other than current. Hence power measurement permits diagnosis of a malfunction in many more cases, or permits it more readily, than does current measurement. For reasons which will become apparent, however, no connectionless device is currently available for power measurement.

Conventional wattmeters for use with powerlines are generally of the electrodynamometer type. This apparatus is constructed with two coils, one resembling the moving coil of a D'Arsonval galvanometer, the other a fixed field coil. Four wire connections to the power conductor being measured are required, whereby one coil is placed in series with the conductor to measure current and the other is connected across the conductor to ground to measure potential. Because of the necessity for ohmic connections, the electrodynamometer wattmeter, is ill-suited for portable use, particularly as a diagnostic tool for electrical maintenance and repair.

Portable instruments operable without ohmic connections, on the other hand, have been limited to current measurement, because no method of measuring voltage without ohmic contacts which is otherwise compatible with such instruments has heretofore been known. The wide variations in size, geometry and insulation thickness among wires which must be measured with any such instruments have heretofore precluded the use of electrostatic probes due to their high sensitivity to such variations in electrical conductors.

SUMMARY OF THE INVENTION

In accordance with the invention an electrical instrument is provided which is capable of measuring AC power, power factor or voltage with respect to ground, without ohmic connection to the conductor being measured.

For sensing the current carried by the conductor, a signal proportional to the current is produced by electromagnetic induction through a clamp-on transformer. In those cases where the line voltage is known, which is common for measurements made on motors or other electrical devices which operate at a standard line voltage (i.e., 110 volts or 220 volts) means is provided for electrostatically inducing a signal in phase with the voltage, and hence representative of the phase relationship between voltage and current. A circuit is provided for combining the current-representative and voltage-representative signals so induced to indicate the power being carried by the conductor. The power for different known line voltages may be read on plural scales provided on the meter face, or a scale switch may be provided for changing the scale of the meter output.

The electrostatically induced voltage is measured between a sensing electrode and a quasi-ground terminal preferably provided by an ohmic or capacitive connection with the operator of the device. In a preferred embodiment of the invention, the electrostatic field-sensing electrode is formed by the openable transformer itself. The magnitude of the voltage thus induced varies greatly, depending upon the precise geometrical relation between the electrode, the conductor, the quasi-ground terminal and all proximate metal elements. Accordingly, the electrostatically induced voltage is connected to provide phase angle information, and the actual amplitude of the conductor voltage is assumed to be known, as is ordinarily the case since the line voltage of most power sources is carefully regulated.

In accordance with the invention the electrostatically induced voltage is connected to control a polarity switch for connecting predetermined portions of the electromagnetically induced current waveform to an indicator, depending on the phase angle $\theta$ between voltage and current. A polarity switch is defined herein as a single-pole, voltage-controlled, bipolar switch actuable by a single voltage polarity actuation being substantially independent of the amplitude of such voltage. A simple example of a polarity switch is a conventional single-pole relay having a voltage rectifier connected in series with its actuating coil. Power measurement is accomplished by connecting the polarity switch in series with a DC meter and also in series with the powerline current or a fixed portion thereof. The polarity switch is connected to be actuated by the electrostatically induced voltage in-phase with the line voltage. When the line voltage and current are in phase, the polarity switch acts as a half-wave rectifier, resulting in meter deflection. For any phase angle $\theta$ between voltage and current meter deflection is proportional to the mean current I flowing through it, given by $$I = \frac{I_p}{2\pi} \int_{\theta}^{\pi+\theta} \sin \Phi d\Phi = \frac{I_p}{\pi} \cos \theta',$$

where $I_p$ is the peak current. Meter deflection can be calibrated to indicate power, inasmuch as the r.m.s. line voltage is a known constant, normally, either 110 or 220 volts to within ±10 percent.

For certain purposes, it is desirable to measure power factor, rather than power. For this purpose, and embodiment of the invention is provided wherein one signal is derived by electromagnetic induction and another signal is derived by electrostatic induction, and circuit means is provided for indicating the phase relationship between the two signals, or power factor.

In many instances, it is desired to measure power with respect to a conductor at an unknown line voltage. Sometimes, the line voltage may be at its rated value, and it is useful to be able to measure the actual instantaneous line voltage. In accordance with additional embodiments of this invention, apparatus is provided for measuring power as well as voltage without ohmic connection to the conductor under test. In such embodiments a signal representative of the voltage amplitude and phase is derived electrostatically through a voltage probe specially shaped and constructed according to the invention, resulting in minimizing the effect of differences in the conductor being tested and related positional factors. In addition, the circuit of such voltage probe incorporates a high impedance amplifier which, in conjunction with certain preferred features of the probe and its sensing electrode described herein, contributed to minimizing the unwanted effects of difference in the position and size of the conductor being tested.

In conjunction with a clamp-on-type inductive probe for providing a current representative of the amplitude and phase of the current flowing in the conductor, a voltage probe as described above may be used for wattage measurement when the line voltage is unknown by combining the voltage- and current-representative signals in a multiplying circuit as explained herein.

DESCRIPTION OF THE DRAWINGS

Preferred embodiments of the invention will be described in conjunction with the accompanying drawings, in which:

FIG. 1 is a schematic circuit diagram of an embodiment of the invention which includes a polarity switch possessing high-impedance actuating means;

FIG. 2 is a circuit diagram of an alternative embodiment of the invention which includes a polarity switch possessing low-impedance actuation means;

FIG. 3 is a block diagram of an embodiment of the invention employing an automatic gain control (AGC) circuit to cancel out variations in the electrostatically induced voltage;

FIG. 4 is a block diagram of an embodiment of the invention employing an instantaneous reading ammeter circuit;

Figure 5:
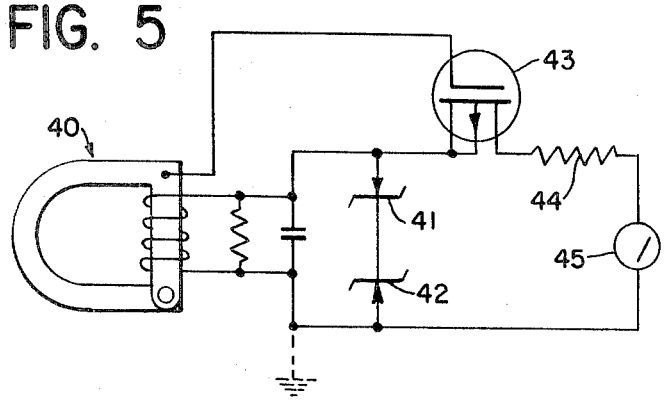
Figure 7:
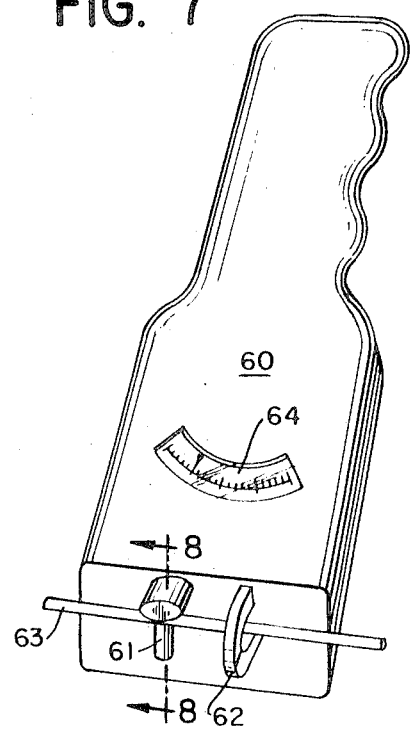
Figure 6:
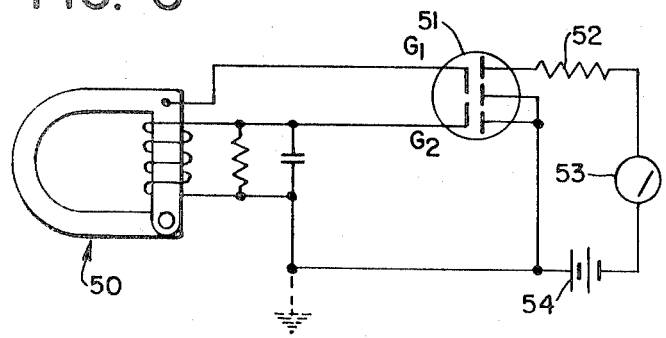
Figure 10:
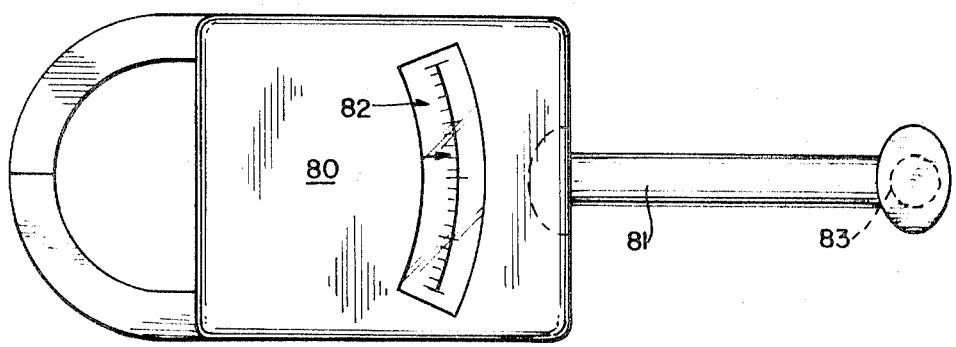
Figure 8:
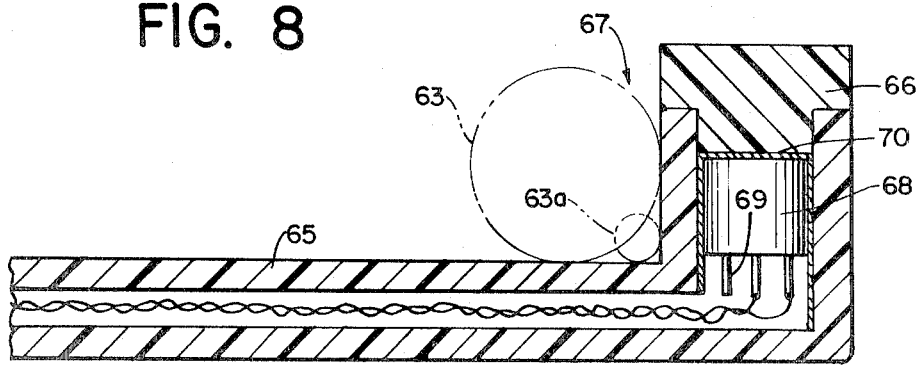
Figure 9:
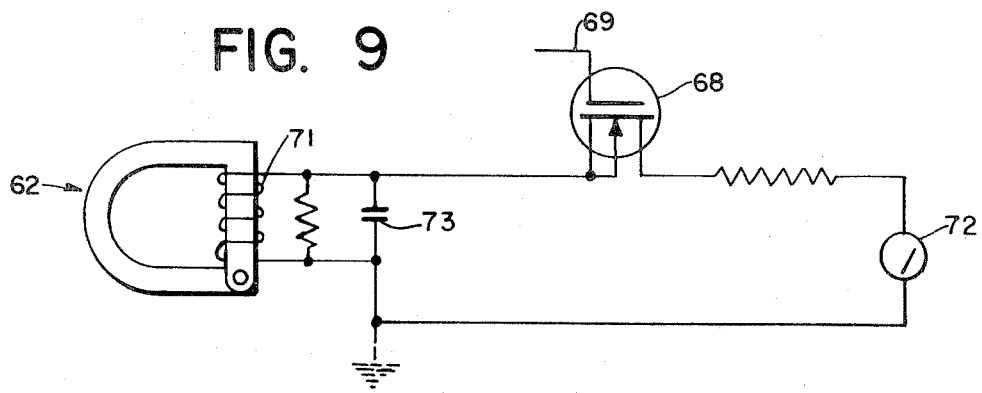

DIG. 5 is a schematic diagram of a power factor meter constructed in accordance with the invention;

FIG. 6 is a schematic circuit diagram illustrating a different embodiment of a power factor meter in accordance with the invention;

FIG. 7 is a perspective view of a wattmeter constructed in accordance with the invention which is capable of wattage measurement where neither the line voltage nor the current is known;

FIG. 8 is a sectional view of the voltage probe in the meter of FIG. 5 taken along the line 8—8;

FIG. 9 is a schematic diagram of the circuit of the wattmeter of FIGS. 7 and 8;

FIG. 10 is a perspective view of an electrostatic voltmeter; and

Figure 11:
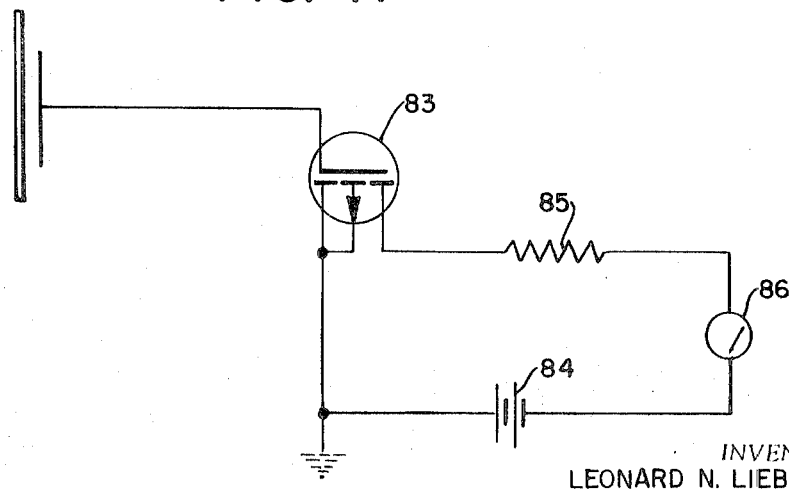

FIG. 11 is a schematic diagram of the voltage measurement circuit of the device of FIG. 10.

DESCRIPTION OF PREFERRED EMBODIMENTS to FIG. 1, showing a wattmeter embodying the invention for use in measurements on conductors at known voltages, an openable iron core 1 surrounds a conductor 2 with respect to which electrical power is to be measured. Hence conductor 2 is effectively a single-turn primary winding of a transformer whose secondary winding is coil 3. The transformer core is openable by rotation of element 1a thereof about pin 1b. Openable core 1 and transformer coil 3 may be identical to any such elements used in conventional clamp-on ammeters.

Coil 3 is connected in a series circuit which the source and drain terminals 4a and 4b of FET (field-effect transistor) 4 and a meter 5. Which may be a conventional DC milliameter. FET 4 in this embodiment constitutes a polarity switch, which is bipolar in that it conducts current through its source and drain terminals equally well in both directions. The gate terminal 4c of FET 4 constitutes an exceedingly high-impedance means for switch actuation, and hence is connected directly to the electrostatic field-sensing electrode, which in this embodiment is constituted by transformer core 1. No intervening amplification or impedance-matching means is required. Meter 5 may be any DC meter having current-sensitivity adequate to respond to the rectified coil output current, and such meter may be identical with meters generally used in clamp-ons ammeters.

One side of secondary coil 3 is connected to a ground terminal 6, which is preferred to herein as a quasi-ground connection in that it employs that human operator to establish a ground potential reference, either through an ohmic or capacitive connection. Ground terminal 6 (connected via a dashed line to indicate that it is a quasi-ground connection) may merely be a conductive (i.e. metal) portion of the instrument case, preferably designed to be grasped by the operator. Alternatively, it may be a capacitive quasi-ground formed by utilizing the capacity of the meter circuit or an extended metallic portion thereof as a capacitive connection. Such an extended metallic portion may for example be a sheet of metal foil disposed adjacent the inner surface of the handle portion of a nonconducting instrument case. In the event that phase shift is introduced by the circuit or by distributed reactance, a compensating fixed phase shift network may be provided by a capacitor 9 connected across coil 8 and having a capacitance adequate to cancel out any such phase shift. A resistor 7 is connected between the source and gate terminals of 4a and 4c of sufficiently high resistance to prevent accumulation of static charge on the input to the FET. Alternatively, such resistor may be connected between the gate and source terminals. Its value may be on the order of 200 megohms.

Resistor 8 is a calibration resistor, the value of which is chosen to obtain the meter deflection required for a correct power reading, depending on the particular meter, its scale and the remaining circuit parameters. Preferably, resistor 8 is a variable resistor for permitting adjustment of the calibration, or scale factor, to obtain direct power readings at different known voltage. Alternatively, a number of scales may be provided on the instrument face, one corresponding to each of standard-line voltages commonly employed, such as 110 and 220 volts.

As mentioned above, no amplification or impedance compensation is required between the voltage-sensing electrode and the gate terminal of the FET due to the high impedance of the gate terminal. It is important that the impedance seen by the electrostatic field-sensing electrode be high, because the proximity capacitance between the sensing electrode and the nearby insulated power conductor is exceedingly small, so that the induced electrostatic potential with respect to ground can be measured only with high-impedance means. For example, proximity capacitance can ordinarily be expected to fall in the range of about 3 to 20 picofarads, so that the electrode-to-conductor, impedance at 60 Hz. is from $10^9$ to $2\times10^8\Omega$. If the sensing electrode is connected to the input of a wattmeter circuit having comparable or greater input impedance, nearly the full line voltage is available at the circuit input. Alternatively, if the wattmeter circuit has a low-input impedance, the available input voltage will be reduced by the ratio of the input impedance to the electrode-to-conductor impedance, and may require amplification.

Thus, in the embodiment of FIG. 2, wherein reference numerals common to FIG. 1 denote circuit components described with respect to FIG. 1, the polarity switch is constituted by a conventional balanced modulator circuit 10 employing four matched solid-state diodes. Inasmuch as the input impedance of the balanced modulator 10 is far lower than the impedance of the field-sensing electrode 1, an impedance-matching circuit or amplifier 11 is connected between such electrode and polarity switch 10. Passive impedance-matching circuit elements suitable for 60 Hz. are usually physically large and hence impractical for a portable device. Thus amplifier 11 is preferably a solid-state amplifier, one or two stages of amplification usually being adequate. For portability and convenience, amplifier 11 may derive operating power from the circuit being measured, rather than from batteries or other external means. Auxiliary winding 12 is provided on openable transformer core 1 for this purpose. The AC current induced in winding 12 is rectified by a diode 12a, smoothed by capacitor 12b and supplied to amplifier 11. In place of balanced modulator 10, the polarity switch may employ mechanical reed relays, or anyone of number of solid-state or vacuum tube devices consistent with the definition of a polarity switch as given above.

FIG. 3 illustrates an alternative embodiment of the invention wherein a voltage is initially derived which is proportional to the instantaneous product $VI \cos \theta$, and is compensated by an AGC (automatic gain control) circuit for variations in the proportionality between the electrostatically induced voltage and the actual line voltage. AGC circuits are conventional and do not by themselves form part of this invention. A sensing unit 20 in FIG. 3 incorporates an openable transformer core providing current and voltage output terminals, and a quasi-ground terminal. Sensing unit 20, which may be identical to the transformer core and associated windings and terminals shown in FIG. 1, provides voltage and current waveforms (as described above) which are applied to a multiplying circuit 21 that produces an output voltage proportional to the instantaneous product $VI \cos \theta$. Multiplier circuit 21 may contain any of several nonlinear circuit elements utilized in a wide variety of conventional wattmeter circuits. This output voltage is amplified in a conventional AGC circuit 22, the gain of which is inversely proportional to the amplitude $v$. The output of AGC circuit 22 is thus proportional to $I \cos \theta$ and independent of $V$. As in the previously described embodiments, knowledge of the r.m.s. line voltage is assumed and is preferably taken into account in the scale of indicator 23. A resistor (not shown) may be connected in circuit with meter 23 for calibrating the device or for varying the scale factor to compensate for different known line voltages.

FIG. 4 shows an alternative embodiment of the invention utilizing an instantaneous reading ammeter circuit and a trigger circuit actuated by the conductor voltage. The ammeter reads the conductor voltage or a fixed portion thereof at the instant of maximum line voltage. Consequently, the ammeter deflection yields the product $I \cos \theta$. As with the previously described embodiment, the known line voltage determines the indicator scale such that the product $I \cos \theta$ is indicative of power.

A sensing unit 30 in FIG. (identical to sensing unit 20 in FIG. 3) provides current and voltage outputs in the manner described above. The voltage output from sensing unit 30 is connected to the gate terminal of FET 31. The source and drain terminals of FET 31 are connected to a triggered multivibrator 32, the output of which is connected between the gate terminal of FET 33 and a quasi-ground terminal 34. Multivibrator 32 thus produces a relatively narrow sampling pulse (about 5 to 10 percent of the conductor current period) which samples the conductor current at the peak of the voltage waveform, once each cycle. A delay line or equivalent element may be incorporated in multivibrator 32 or a trigger threshold may be provided in multivibrator 32 for assuring that the multivibrator output pulse occurs at the maximum conductor voltage.

The source and drain terminals of FET 33 are connected in circuit with the current output terminal of sensing unit 30, as well as a peak-reading voltmeter 35. Peak-reading voltmeter 35 is known and by itself forms no part of this invention, and accordingly no further description of it is included herein. Indicator 36 is connected in the voltmeter output circuit and adjusted to indicate the value of the sampled current $I \cos \theta$. The scale of meter 36 should be adjusted, depending on the sample pulse width of multivibrator 32, to read full scale when the conductor voltage and current are in phase.

In many cases it is desirable to measure power factor, rather than power, and embodiments of the invention suitable for this purpose are illustrated in FIGS. 5 and 6.

FIG. 5 shows an embodiment of a power factor meter in which a sensing unit 40 is provided similar to sensing unit 20 in FIG. 3, the current output terminals of which are connected across a pair of opposed Zener diodes 41 and 42 for limiting both the positive and negative halves of the current waveform in accordance with the Zener breakdown voltage of the diodes. The source and drain terminals of FET 43 are connected in series with a limiting resistor 44 and DC ammeter 45, the series branch thus formed being connected in parallel with the opposed Zener diodes across the current output terminals of sensing unit 40. FET 43 thus operates to gate the amplitude-limited current waveform to ammeter 45 during portions of the voltage waveform applied at its gate terminal. The deflection of ammeter 45 is consequently directly proportional to the phase difference between conductor voltage and current; full-scale meter output occurs with the voltage and current in phase ($\Phi=0$) and becomes zero as $\Phi$ goes to 90°.

An alternative embodiment of a power factor meter is illustrated in FIG. 6, and includes a sensing unit 50 which may be identical to sensing unit 40 in FIG. 5. The voltage and current signals from sensing unit 50 are connected to control gates $G_1$ and $G_2$, respectively, of a dual-gate FET 51. The source and drain terminals of FET 51 are connected in circuit with limiting resistor 52, DC ammeter 53 and battery 54, the value of which is chosen in conjunction with resistor 52 to provide full-scale deflection of ammeter 53 for a power factor of unity, i.e. when the voltage and current are in phase.

FIGS. 7 through 9 illustrate embodiments of the invention for measuring the power carried by a conductor which does not require knowledge of the conductor line voltage. These embodiments differ from those illustrated in FIGS. 1 through 4 in that knowledge of the line voltage is required with the latter.

FIG. 7 is a perspective view of a wattmeter in accordance with the invention, which includes a housing 60 formed of plastic or any other durable material. A voltage probe 61 and current probe 62 extend from one side of housing 60 such that a conductor 63 being tested may be lodged against the seat formed by the inner angle of voltage probe 61 and at the same time conveniently passes through the jaws of current probe 62. Current probe 62 may be similar to that employed in any clamp-on ammeter and is schematically illustrated in FIG. 1, for example, except that it does not serve as the electrostatic voltage probe in FIG. 7. The lower portion of housing 60 is shaped as a handgrip, forming a quasi-ground terminal as described above. An ammeter is incorporated in the housing so as to be visible through a transparent faceplate 64.

Voltage probe 64 is shown in greater detail in FIG. 8, which is a sectional view taken along line 8—8 in FIG. 7. A rectangular tubular member 65 extends outwardly from housing 60 and forms a right angle at its end portion 66, so that a seat area 67 is effectively formed by an inner angle of portions 65 and 66, against which the conductor 61 under test may be firmly seated. FET 68 is mounted in the probe such that its gate terminal 69 is approximately at the apex formed by probe members 65 and 66. The constraints on the position of gate terminal 69 will become clearer from an understanding of the way in which the probe structure compensates for differences in the size of the conductor 63 being tested.

As discussed above, it has not heretofore been practical to electrostatically measure the voltage of a conductor without ohmic connection to the conductor because of the wide variations in probe-to-conductor capacitance with different conductor sizes and geometries. This undesired effect is minimized in accordance with the invention by constructing probe seat 67 such that in measuring the voltage of a large diameter conductor 63, the spacing between the conductor and probe terminal 69 automatically becomes larger than with a smaller diameter conductor 63a, thereby compensating for greater effective area of the larger conductor with respect to the probe. Since the probe-to-conductor capacitance is approximately proportional to this effective area and inversely proportional to the distance between the conductor and the terminal, the capacitance thereby tends to remain constant.

Probe terminal 69 is preferably made as small as is practical consistent with the minimum signal amplitude required, thereby minimizing probe-to-ground capacitance which would otherwise shunt the FET input terminal, reducing its input impedance to unacceptable levels. Additionally, the signal provided by a small probe terminal has less tendency to vary with probe orientation than if the probe has greater spacial extent. Also, the probe terminal is preferably spaced from the conductor rather than being directly adjacent to it, to avoid the relatively large changes of field with distance (from the conductor) encountered for some conductor configurations. In FIG. 8, probe terminal 69 is about one-fourth inch from the conductor.

The precise angle formed by probe members 65 and 66 is not critical, and the invention comprehends any probe structure constructed so as to form the conductor contact surface which comprises seat 67 in a manner which adjusts probe-to-conductor spacing inversely in accordance with conductor diameter. FET 68 is surrounded by a thin sheet 70 of electrically conducting shielding. Its source and drain terminals are connected to wires extending through tubular probe member 65 to housing 60. In place of FET 68, mounted directly in the electrostatic probe, a high-impedance vacuum tube amplifier, which is necessarily larger in size, may be provided in housing 60, its grid terminal being connected through a shielded cable to a sensing electrode mounted at the same place as electrode 69. Preferably, the input impedance of the amplifier is on the order of 1,000 megohms.

FIG. 9 illustrates a wattmeter circuit which may, for example, be provided in the housing of FIGS. 7 and 8. Clamp-on transformer 62 includes a current in winding 71, and thereby in the source-drain-circuit of FET 68, proportional to conductor current. The gate terminal of FET 68 constitutes electrode 69. FET 68 and the remaining circuit elements are chosen such that the FET operates in its linear amplification range, rather than as a gate. Hence meter 72 reads $IV \cos \theta$ and no independent knowledge of line voltage or current need be assumed. Capacitor 73 is preferably adjustable to a value such that meter 72 reads a maximum when the voltage and current are in phase.

FIGS. 10 and 11 illustrate an electrostatic voltmeter in accordance with the invention. As shown in FIG. 10, the device is housed in a body 80, the central portion of which may conveniently be hand-held and is constructed as a quasi-ground terminal, explained above. Probe member 81, which may be identical to the probe shown in detail in FIG. 8, is slidably mounted in housing 80. The voltage measured by the instrument is displayed on a dial face 82. The instrument may additionally include a clamp-on transformer probe, along with the necessary internal circuitry for measuring current. However, the current-measuring circuit and probe in this embodiment are independent of the voltage measurement probe and circuit and form no part of this invention.

FIG. 11 is a voltage-measuring circuit which may be provided in housing 80. The gate terminal of FET 83 constitutes the electrostatic voltage probe terminal of the device, and it source and drain terminals are connected in series with a battery 84, resistor 85 and meter 86, the last of which is disposed beneath dial face 82. The circuit elements are chosen such that FET 83 operates in its linear amplification region, so that meter 86 reads conductor voltage directly.

While the circuits illustrated herein employ FET's for the most part, this invention is by no means restricted to the use of such devices. Other gating or amplifying devices familiar to those in this art and which have the requisite high-input impedance may alternatively be used.

It will be apparent that the invention is not limited to the specific feature in the above-described preferred embodiments, and that various modifications may be made without departing from its scope as defined in the claims.

We claim:

1. Apparatus for measuring the power carried by electrical conductor without respect to conductor diameter and without ohmic connection to such conductor, comprising:
    a current probe for producing by electromagnetic induction a signal proportional to the current flowing in such conductor;
    a voltage probe including a quasi-ground terminal for producing by electrostatic induction a signal in-phase with the voltage, to ground, of such conductor, and
    circuit means responsive to the signals produced by the current and voltage probes for signalling at its output the power carried by such conductor.

2. Apparatus as defined in claim 1 wherein the voltage, to ground, of such conductor is known, said circuit means including means for adjusting the scale of its output in accordance with such known voltage value.

3. Apparatus as defined in claim 1 for indicating the power factor of the power carried by such electrical conductor, said circuit means providing an output signal corresponding to the phase angle between said current and voltage signals.

4. Apparatus as defined in claim 3 wherein said circuit means includes an output meter and a polarity switch actuable by portions of said voltage signal for connecting said current signal to said output meter during predetermined portions of the voltage signal, and means for amplitude-limiting the current to said output meter to a predetermined amplitude, whereby said output meter provides an indication of the phase angle between the voltage and current.

5. Apparatus as defined in claim 4 wherein said polarity switch is an FET, the source and drain terminals of which are connected in circuit with said current probe, said amplitude-limiting means including a pair of series-connected opposed Zener diodes in parallel with said current probe, the gate terminal of said FET being connected to said voltage probe.

6. Apparatus as defined in claim 4 wherein said polarity switch is a dual-gate FET, one gate of which is connected to said voltage probe and the other gate of which is connected to said current probe, said FET being connected through its source and drain terminals in circuit with an output meter and a voltage source.

7. Apparatus as defined in claim 1 for measuring power where the line voltage is unknown, wherein said voltage probe includes a probe head forming a substantially rectangular seat for such conductor, said probe head containing a sensing electrode and said sensing electrode and said seat being formed such that the conductor-to-electrode spacing increases with increasing conductor diameter to minimize variations in conductor-to-electrode capacitance, the signal produced by the voltage probe thereby remaining substantially proportional to the conductor voltage; said circuit means producing an output signal proportional to the power carried by such conductor.

8. Apparatus as defined in claim 7 wherein said circuit means includes an output meter, and a high-impedance amplifier connected to be responsive to said voltage and current signals for indicating at said output meter the product of the induced voltage and current and the phase angle between them.

9. An electrostatic voltmeter for measuring the voltage to ground of a conductor without ohmic contact to such conductor, comprising a voltage probe head forming a substantially rectangular seat for such conductor; a sensing electrode mounted in said probe head, said sensing electrode and said seat being formed such that the conductor-to-electrode spacing varied inversely with the diameter of such conductor to minimize variations in conductor-to-electrode capacitance; amplifying means having a high-impedance input terminal connected to said sensing electrode for amplifying signals electrostatically induced thereon; and an output meter connected to said amplifier for indicating the value of such induced voltage.

10. Apparatus as defined in claim 9 wherein said voltmeter is contained in a housing said housing including means forming a quasi-ground terminal in conjunction with a human operator holding said housing.

11. A connectionless wattmeter for measuring the power applied to an alternating current load through a conductor at a known voltage, without respect to conductor diameter comprising;
    an operable transformer core having a secondary winding for providing a current signal proportional to the load current I in such conductor, such conductor forming the primary winding thereof;
    means for deriving by electrostatic induction a voltage in-phase with the voltage across said load;
    an electrical indicator; and
    circuit means responsive to said current and to said voltage for causing said indicator to indicate a value proportional to $I \cos \theta$, independent of the voltage amplitude where $\theta$ is the phase angle between said current and said voltage.

12. A connectionless wattmeter as defined in claim 11 wherein said circuit means is constituted by a polarity switch actuable by portions of said electrostatically induced voltage having a predetermined polarity for connecting said secondary winding to indicator.

13. A connectionless wattmeter as defined in claim 12 wherein said wattmeter is mounted in a housing and said electrostatic induction means includes an ohmic or capacitive contact formed on said housing for providing a quasi-ground connection with human operator holding the housing.

14. A connectionless wattmeter as defined in claim 13 wherein said polarity-switching means includes a field effect transmitter connected to conduct current between said secondary winding and the indicator during portions of said voltage having a predetermined polarity.

15. A connectionless wattmeter as defined in claim 13 wherein said polarity-switching means includes a balanced modulator circuit and an amplifier for applying said voltage to said modulator circuit.

16. A connectionless wattmeter as defined in claim 15 including an additional secondary winding on said openable core and a rectifier connected in circuit therewith for providing power to said amplifier.

17. A connectionless wattmeter as defined in claim 14 wherein said electrostatic induction means includes said openable transformer core, said voltage being provided between said transformer core and said ohmic or capacitive contact.

18. A connectionless wattmeter as defined in claim 15 wherein said electrostatic induction means includes said openable transformer core, said voltage being provided between said transformer core and said ohmic or capacitive contact.

19. A connectionless wattmeter as defined in claim 13 including a variable impedance connected to said indicator for adjusting the indication provided by said indicator in accordance with said known voltage.

20. An apparatus as defined in claim 11 wherein said circuit means includes a multiplier circuit responsive to said current and to said voltage for providing an output signal proportional $IV \cos \theta$, where $V$ is the value of said electrostatically induced voltage, and an automatic gain control circuit for multiplying said output signal by $I/V$, whereby the output of said automatic gain control circuit is proportional to $I \cos \theta$.

21. A connectionless wattmeter for measuring the power applied to an alternating current load through a conductor at a known voltage, comprising;
an openable transformer core having a secondary winding for providing a current signal proportional to the load current $I$ in such conductor, such conductor forming the primary winding thereof;
means for deriving by electrostatic induction a voltage in-phase with the voltage across said load;
an electrical indicator;
a pulse generator means responsive to the voltage derived by electrostatic induction for producing sampling pulses during the peak portions thereof; and
a peak-reading voltmeter, and gating means responsive to said sampling pulses for connecting the peak-reading voltmeter to said secondary winding during each sampling pulse, whereby said electrical indicator indicates the product $I \cos \theta$, where $\theta$ is the phase angle between said current and said voltage.

22. A method of measuring the power applied to an alternating current load through a conductor at a known voltage without making any ohmic connection to said load or said conductor, comprising deriving by electromagnetic induction a current proportional to the load current $I$ in such conductor; deriving by electrostatic induction a voltage in-phase with a voltage across said load; forming the product $I \cos \theta$, where $\theta$ is the phase angle between said voltage and said current, and multiplying said product by the known value of said load voltage to obtain the power consumed by said load.

* * * * *

CERTIFICATE OF CORRECTION

Patent No. 3,621,392     Dated November 16, 1971

Inventor(s) Leonard N. Liebermann and Stanley H. Lai

It is certified that error appears in the above-identified patent and that said Letters Patent are hereby corrected as shown below:

Column 1, line 57 "instruments" should read --instrument--.

Column 2, line 61 "voltage may be" should read --voltage may not be--.

Column 2, line 74 "difference" should read --differences--.

Column 3, line 24 "Dig. 5" should read --Fig. 5--.

Column 5, line 14 "v" should read --V--.

Column 5, line 32 "in Fig." should read --in Fig. 4--.

Column 6, line 34 "Voltage probe 64" should read --Voltage probe 61--.

Column 6, line 39 "conductor 61" should read --conductor 63--.

Column 6, line 57 "smaller" should read --small--.

Column 7, line 18 "includes" should read --induces--.

Column 7, line 37 "probe, along" should read --probe, illustrated at its left side opposite the voltage probe, along--.

Column 7, line 44 "it" should read --its--.

Column 8, line 49 "varied" should read --varies--.

Column 9, line 13 "transmitter" should read --transistor--.

Signed and sealed this 13th day of June 1972.

(SEAL)
Attest:

EDWARD M. FLETCHER, JR.
Attesting Officer

ROBERT GOTTSCHALK
Commissioner of Patents